United States Patent
Liberfarb

[11] Patent Number: 6,116,263
[45] Date of Patent: Sep. 12, 2000

[54] PROPORTIONAL PRIORITY FLOW REGULATOR WITH REVERSE FLOW CONTROL

[75] Inventor: Zilek Liberfarb, Morton Grove, Ill.

[73] Assignee: HydraForce, Inc., Lincolnshire, Ill.

[21] Appl. No.: 09/391,056

[22] Filed: Sep. 7, 1999

Related U.S. Application Data

[63] Continuation-in-part of application No. 09/344,689, Jun. 25, 1999.
[60] Provisional application No. 60/093,933, Jul. 23, 1998, and provisional application No. 60/101,052, Sep. 18, 1998.

[51] Int. Cl.[7] ................................. F15B 13/044
[52] U.S. Cl. ............................ 137/115.03; 137/115.13
[58] Field of Search .................... 137/115.03, 115.13

[56] References Cited

U.S. PATENT DOCUMENTS

| | | | |
|---|---|---|---|
| 3,532,104 | 10/1970 | Hoen | 137/503 |
| 3,785,392 | 1/1974 | Baker | 137/115.03 X |
| 4,121,610 | 10/1978 | Harms et al. | 137/115.03 |
| 4,367,765 | 1/1983 | Moretti et al. | 137/115.03 X |
| 4,589,437 | 5/1986 | Zeuner et al. | 137/115.03 |
| 5,836,335 | 11/1998 | Harms et al. | 137/625.61 X |

*Primary Examiner*—Gerald A. Michalsky
*Attorney, Agent, or Firm*—Leydig, Voit & Mayer, Ltd.

[57] ABSTRACT

An inventive priority flow regulator comprises a valve assembly which is supported by a housing at one end and confines an electro-magnetic actuator at the other end. The housing has an inlet port, an outlet port, and a regulated port. The valve assembly includes a hollow cage that cooperates with a cavity formed in the housing to define a plurality of internal chambers, a hollow compensating spool slidably arranged within the cage between rows of cross-sectional holes formed in the cage, a hollow guide member slidably arranged within the compensating spool and having cross-holes formed therein, and regulating and dampening spools slidably arranged within the guide member at opposite ends thereof. The internal chambers of the housing communicate with respective ports formed in the housing to provide a priority flow configuration as well as a reverse flow configuration.

15 Claims, 2 Drawing Sheets

PROPORTIONAL PRIORITY FLOW REGULATOR WITH REVERSE FLOW CONTROL

CROSS REFERENCE TO RELATED APPLICATIONS

This application is a continuation-in-part of application Ser. No. 09/344,689 for a Bi-Directional Flow Control Valve, filed Jun. 25, 1999, which claims the benefit of U.S. Provisional Application No. 60/093,933 filed Jul. 23, 1998.

This application also claims the benefit of U.S. Provisional Application No. 60/101,052 for a Proportional Priority Flow Regulator with Reverse Flow Control, filed Sep. 18, 1998.

FIELD OF THE INVENTION

The present invention relates generally to valves and, more particularly, to a proportional priority flow regulator which provides improved flow control characteristics.

BACKGROUND OF THE INVENTION

Flow control valves are frequently used to regulate flow through piping systems and the like. In one type of flow control valve, an electro-magnetic actuator in the form of a solenoid is utilized to regulate flow through a cooperating valve assembly. Such actuators ordinarily comprise a hollow guide tube with a passageway formed therein, an electrically energizable solenoid coil wrapped around the guide tube, and a magnetic armature or a plunger slidably disposed within the passageway of the guide tube and interacting with the valve assembly. When an electric current is passed through the solenoid coil, a magnetic field (or flux) is produced within the guide tube which moves the armature along the passageway and causes flow through the valve assembly which is proportional to the current applied to the coil.

A proportional priority flow regulator is a specific type of flow control valve used to regulate fluid flow on a priority basis. Proportional priority flow regulators are typically used in lifting devices, such as material handling, agriculture and construction equipment, to allow an operator to raise a load at a controlled speed by directing a high-pressure fluid to a single acting cylinder over a regulated line. Lowering the load is usually accomplished by the force of gravity, requiring the use of additional flow control devices such as flow regulators, directional valves, check valves, and the like to control the flow fluid from the lifting device to an overflow tank and thereby control the rate of descent of the load.

It would be more economical to use a single regulator for directing fluid to the lift as well as for directing the excess fluid to an overflow tank. However, conventional proportional priority flow regulators can only provide controllable flow in one direction—from the high-pressure input to the regulated line.

OBJECTS OF THE INVENTION

Accordingly, a general object of the present invention is to provide a proportional priority flow regulator with controllable flow control characteristics in opposite flow directions.

A more specific object of the present invention is to provide a proportional priority flow regulator with substantially identical flow control characteristics in opposite flow directions.

A related object of the present invention is to provide a proportional priority flow regulator which achieves a substantially constant "flow versus current" relationship in either flow direction.

A more specific object of the present invention is to provide a proportional priority flow regulator with reverse control wherein the flow control characteristics are substantially identical in both the priority and reverse control modes.

An additional object of the present invention is to provide a priority flow regulator as characterized above which is reliable, durable, and convenient to use.

SUMMARY OF THE INVENTION

In accordance with these and other objects, a proportional priority flow regulator is disclosed herein. The inventive priority flow regulator comprises a valve assembly which is supported by a housing at one end and confines an electromagnetic actuator at the other end. The housing has an inlet port, an outlet port, and a regulated port. The valve assembly includes a hollow cage that cooperates with a cavity formed in the housing to define a plurality of internal chambers, a hollow compensating spool slidably arranged within the cage between rows of cross-sectional holes formed in the cage, a hollow guide member slidably arranged within the compensating spool and having cross-holes formed therein, and regulating and dampening spools slidably arranged within the guide member at opposite ends thereof. The internal chambers of the housing communicate with respective ports formed in the housing to provide a priority flow configuration as well as a reverse flow configuration. The actuator includes a solenoid coil wound around a hollow guide tube, a movable plunger or armature slidably arranged within the guide tube, a pole piece anchored within the guide tube, and a push pin attached to and extending from the armature and engaging the regulating spool of the valve assembly.

When the solenoid coil of the actuator is electrically energized with current, the armature of the actuator moves toward the pole piece which causes the regulating spool of the valve assembly to move between first and second operating positions. In the first operating position, cross-holes formed in the regulating spool are out of alignment with cross-holes formed in the guide member which blocks flow between the ports of the housing. In the second operating position, the cross-holes of the regulating spool are at least partially aligned with the cross-holes of the guide member which permits flow between the ports of the housing.

The pressure differential across the priority flow regulator and the direction of flow between the ports induces movement in the compensating spool in a direction either towards or away from the actuator. In either event, the compensating spool controls the opening of one of the rows of cross-sectional holes of the cage to maintain a constant pressure differential across the regulator. On account of this construction, the inventive priority flow regulator provides precise flow control and consistent flow control characteristics in each flow direction including, for example, a substantially constant "flow versus current" relationship.

These and other objects, features, and advantages of the present invention will become more readily apparent upon reading the following detailed description of the preferred exemplified embodiment and upon reference to the accompanying drawing wherein:

DETAILED DESCRIPTION OF THE PREFERRED EMBODIMENT

This application is a continuation-in-part of application Ser. No. 09/344,689 for a Bi-Directional Flow Control Valve, filed Jun. 25, 1999, which claims the benefit of U.S. Provisional Application No. 60/093,933 filed Jul. 23, 1998. application Ser. No. 09/344,689 and Provisional Application No. 60/093,933 are incorporated herein by reference in their entirety.

This application also claims the benefit of U.S. Provisional Application No. 60/101,052 for a Proportional Priority Flow Regulator with Reverse Flow Control, filed Sep. 18, 1998, and incorporated herein by reference in its entirety.

Figure 1:
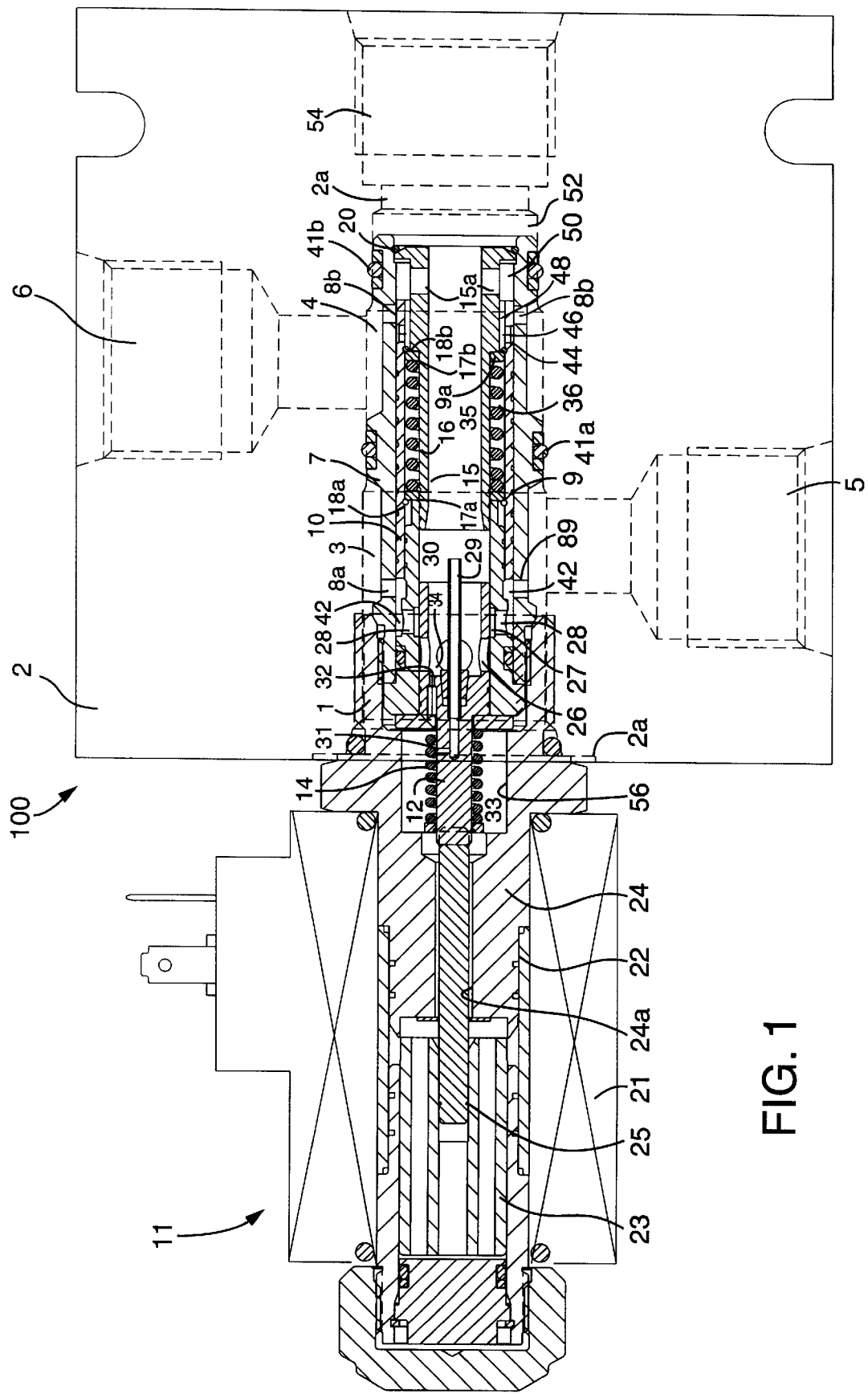
FIG. 1 is a cross-sectional view of a proportional priority flow regulator in accordance with the present invention.

Turning now to the drawing, a proportional priority flow regulator constructed in accordance with the teachings of the present invention is designated generally by reference numeral 100. In the illustrated embodiment, the flow regulator 100 comprises a valve assembly 1 which is supported by a housing 2 at one end and confines an electro-magnetic actuator 11 at the other end. As shown in FIG. 1, the valve assembly 1 is received by a longitudinal cavity 2a formed within the housing 2 and includes a hollow cage 7 that cooperates with the longitudinal cavity 2a to define a internal chambers 3, 4 and 52. The housing 2 also has a regulated port 5, an outlet port 6 and an inlet port 54 formed therein which communicate with internal chambers 3, 4 and 52 respectively.

The cage 7 of the valve assembly 1 is generally cylindrical in configuration and is supported within and against the longitudinal cavity 2a of the housing 2 by a pair of spaced apart sealing members such as O-rings 41a and 41b or the like. The cage 7 also has two rows of cross-sectional holes 8a and 8b formed therein.

In addition to the cage 7, the valve assembly 1 also includes a hollow compensating spool 9 which is slidably arranged within the cage 7 between the two rows of cross-sectional holes 8a and 8b, a hollow guide member 10 which is slidably arranged within the compensating spool 9, a hollow regulating spool 12 having an internal chamber 34 and a dampening spool 15 having an internal chamber 35. A pair of cross-holes 15a communicates with the internal chamber 35. The cross-holes also 15a communicate with a chamber 50 defined by the cage 7, the compensating spool 9, and the dampening spool 15. The chamber 50 communicates with a passageway 48 defined by the dampening spool 15 and the compensating spool 9. A groove 44 defined around the perimeter of the compensating spool 9 has a plurality of cross-holes or slots 46 with communicate with the passageway 48.

A compensating spring 16 is disposed within an enclosure 36 defined by the compensating spool 9, the dampening spool 15 and the guide 10, and biases the compensating spool 9 to an initial position shown in FIG. 1 in which the slots 46 are to the left of the cross-sectional holes 8b and the chamber 50 is to the right of the cross-sectional holes 8b. This initial position allows the compensating spool 9 to block the flow of fluid through the cross-sectional holes 8b of the cage 7.

The regulating spool 12 and the dampening spool 15 are arranged at opposite ends of the guide member 10. One end of the dampening spool 15 is acted upon by a spring ring 20 which abuts the end of the cage 7 opposite the actuator 11, and the other end of the dampening spool 15 is slidably received within the guide member 10. An internal void 30 is defined by the guide member 10 between the internal chamber 34 and the internal chamber 35.

A regulating spring 14 biases the regulating spool 12 in a first operating position with respect to the guide member 10, as shown, for example, in FIG. 1. In the illustrated embodiment, the regulating spring 14 is arranged within a cavity 33 defined by an inner wall 56 of the valve assembly 1. One end of the compensating spring 16 engages a washer 17a that abuts the guide member 10 and is supported by a spring ring 18a, and the other end of the compensating spring 16 engages a washer 17b that abuts an annular shoulder 9a of the dampening spool 9 and is supported by a spring ring 18b.

A plurality of cross-holes 26 are formed in the regulating spool 12 and a cooperating groove 27 and associated cross-holes 28 are formed in the guide member 10. A passageway 42 defined by the guide 10, the cage 7, and the compensating spool 9 communicates with the cross-sectional holes 28 to allow fluid to flow therebetween. When the regulating spool 12 is in the first operating position, as shown, for example, in FIG. 1, the cross-holes 26 of the regulating spool 12 are out of alignment with the groove 27 and cross-holes 28 of the guide member 10. A tube member 29 which projects from the regulating spool 12 into the internal void 30 communicates with a first orifice 31 in the regulating spool 12 to provide a first fluid path between the cavity 33 and the internal chamber 34. A second orifice 32 in the regulating spool 12 communicates with the chamber 34 and the cavity 33 to provide a second fluid path therebetween.

The electro-magnetic actuator 11 includes a solenoid coil 21 wound around a hollow guide tube 22, a movable plunger or armature 23 slidably arranged within the guide tube 22, and a pole piece 24 anchored within the guide tube 22. The armature 23 and pole piece 24 are preferably fabricated from a magnetic material, such as soft iron. While other constructions are permissible and would fall within the scope and spirit of the present invention, the pole piece 24 of the illustrated embodiment forms an integral part of the valve assembly 1.

When the solenoid coil 21 is electrically energized with current, a magnetic field (or flux) is produced within the guide tube 22 which exerts a longitudinal force on the armature 23. This longitudinal force is proportional to the current supplied to the solenoid coil 21 and causes the armature 23 to move within the guide tube 22 in the direction of the pole piece 24. A magnetic attractive force between the armature 23 and the pole piece 24 exerts a second longitudinal force on the armature 23 which supplements the longitudinal force provided by the solenoid coil 21.

A push pin 25 is attached to and extends from the armature 23 of the actuator 11. This push pin 25 is also received within a longitudinal aperture 24a of the pole piece 24 for engagement with the regulating spool 12 of the valve assembly 1. When the solenoid coil 21 is electrically energized, the armature 23 moves toward the pole piece 24 while the attached push pin 25 counteracts the biasing provided by the regulating spring 14 and pushes the regulating spool 12 toward a second operating position with respect to the guide member 10. In the second operating position, the cross-holes 26 of the regulating spool 12 are at least partially aligned with the groove 27 and cross-holes 28 of the guide member 10. Of course, this movement of the regulating spool 12 between the first and second operating positions and the resulting scope of communication between the cross-holes 26 of the regulating spool 12 and the cross-holes 28 of the guide tube 10 are proportional to the current supplied to the solenoid coil 21.

When used in conjunction with a lifting device, the inlet port 54 may be connected to a high-pressure line, while the regulated port 5 may be connected to a regulated line which is fluidically connected to the lifting device. The outlet port 6 may be connected to an overflow line which is fluidically connected to an overflow tank.

To raise a load, high-pressure fluid is provided to the inlet port 54 for transmission to the regulated port 5, through the regulated line, and to the lifting device. The lifting device uses the pressure of the fluid to exert the force needed to lift the load. Any excess fluid exits through the outlet port 6 for storage in the overflow tank. This mode of operation of the regulator 100 is generally known as the priority mode.

To lower a load, the high-pressure flow to the inlet port is discontinued, and the weight of the load forces fluid back through the regulated line, through the regulator 100, out of the outlet port 6, and into the overflow tank. This mode of operation of the regulator 100 is generally known as the reverse mode.

To operate the regulator 100 in the priority mode, pressurized fluid is introduced into the port 54 and flows through the internal chamber 52, into the internal chamber 35 of the dampening spool 9, and into the internal chamber 50. The pressure of the fluid causes the compensating spool 9 to move toward the actuator 11, thereby widening the internal chamber 50 until the internal chamber 50 becomes aligned with the cross-sectional holes 8b of the cage 7. The fluid is then able to flow through the cross-sectional holes 8b, into the internal chamber 4 and out of the outlet port 6. At this point, it is assumed that there is no current flowing to the solenoid coil 21.

When current is applied to the solenoid coil 21, the regulating spool 12 is moved away from the actuator 11 and into a second operating position in which the cross-holes 26 of the regulating spool 12 and the cross-sectional holes 28 of the guide tube 10 are at least partially aligned.

This alignment permits fluid to flow from port 54 to port 5 along a primary flow path from port 54 of the housing 2, through the internal chamber 52, the internal void 35 of the dampening spool 15, the internal void 30 of the guide tube 10, the internal chamber 34 of the regulating spool 12, the cross-holes 26 of the regulating spool 12, the cross-holes 28 of the guide tube 10, the passageway 42, the cross-sectional holes 8a of the cage 7, into internal chamber 3, and out port 5 of the housing 2. Excess fluid travels along an excess flow path from the inlet port 54 of the housing 2, through the internal chamber 52, the internal void 35 of the dampening spool 15, the cross-holes 15a of the dampening spool 15, the cross-sectional hole 8b of the cage 7, into the internal chamber 4, and out port 6 of the housing 2.

To operate the regulator 100 in the reverse mode, pressurized fluid is introduced into the regulated port 5. The fluid flows into the internal chamber 3, through the cross-sectional holes 8a of the cage 7, the passageway 42, and to the area of the cross-sectional holes 28. At this point, it is assumed that no current is flowing to the solenoid 21 so that the regulating spool 12 is in the first operating position, thereby blocking the fluid from entering the internal chamber 34.

The pressure of the fluid causes the compensating spool 9 to move away from the actuator 11 so that the groove 44 and slots 46 of the compensating spool 9 move past the cross-sectional holes 8b and remain to the right of and unaligned with the cross-sectional holes 8b.

When current is applied to the solenoid 21, the regulating spool 12 is moved into its second operating position in which the cross-holes 26 of the regulating spool 12 are at least partially aligned with the cross-sectional holes 28. The fluid is thereby permitted to flow along a reverse flow path from the regulated port 5, into the internal chamber 3, through the cross-sectional holes 8a, passageway 42, cross-sectional holes 28, cross holes 26, the internal chamber 34, the void 30, the internal chamber 35 and into the area of the cross-sectional holes 15a.

The flow of the fluid into the area of the cross-sectional holes 15a increases the pressure on the side of the compensating spool 9 that is farthest from the actuator 11 and causes the compensating spool 12 to move toward the actuator 11. The groove 44 and slots 46, which were previously to the right of the cross-sectional holes 8b, move toward the actuator 11 to align with the cross-sectional holes 8b. This alignment allows the fluid to continue to flow along the reverse flow path through the passageway 48, the slots 46 of the groove 44, the cross-sectional holes 8b, the internal chamber 4 and out the output port 6.

Thus, the flow regulator 100 of the illustrated embodiment has a "normally closed" configuration which provides no communication between the cross-holes 26 of the regulating spool 12 and the groove 27 and cross-holes 28 of the guide member 10 while the regulating spool 12 is in the first operating position. As the current supplied to the solenoid coil 21 is increased, communication between ports 5 and 6 (reverse mode) or between 54 and 5 (priority mode) is gradually expanded.

Referring again to FIG. 1, a pressure differential across the compensating spool 9 is defined herein as the difference between the fluid pressure in the passageway 42 and the fluid pressure in the chamber 50. In accordance with an important aspect of the invention, any change in this pressure differential induces a corresponding movement in the compensating spool 9, which restricts or increases the flow of fluid through the cross-sectional holes 8b to reestablish the initial pressure differential.

For example, as the pressure of the fluid at the regulated port 5 increases, such as in response to an increased load, the fluid pressure of the passageway 42 increases, causing the compensating spool 9 to move to the right in proportion to this increase. This movement decreases opening of the cross-sectional holes 8b in both the reverse and priority modes. Decreasing the opening of the cross-sectional holes 8b increases the pressure of the fluid in the cavity 50, and reestablishes the initial pressure differential between the passageway 42 and the cavity 50.

As the pressure of the fluid at the regulated port 5 decreases, such as in response to an decreased load, the fluid pressure of the passageway 42 decreases, causing the compensating spool 9 to move to the left in proportion to this decrease. This movement increases opening of the cross-sectional holes 8b in both the reverse and priority modes. Increasing the opening of the cross-sectional holes 8b decreases the pressure of the fluid in the cavity 50, and reestablishes the initial pressure differential between the passageway 42 and the cavity 50.

The opening of the cross-sectional holes 8b of the cage 7 is thus increased or decreased in a manner that is proportional to the pressure differential across the compensating spool 9. The pressure differential between the two ends of the compensating spool 9 is thus maintained at a constant level. In this manner, the compensating spool 9 provides precise flow control and consistent flow control characteristics along the primary flow path in the priority mode and along the reverse flow path in the reverse mode.

In accordance with another important aspect of the present invention, a first fluid path is provided from the cavity 33 of the regulating spool 12, through the orifice 31 and the tube member 29, and into the internal void 30. A second fluid path is provided from the cavity 33, through the orifice 32 and into the internal chamber 34. During operation of the proportional priority flow regulator, the ability of fluid to travel through first and second paths maintain the pressure in the cavity 33 approximately mid-way between the pressure in the void 30 and the pressure in the chamber 34 adjacent to the cross holes 26. On account of this construction, a substantially constant "flow versus current" relationship is provided in either flow direction and a substantially constant pressure differential is maintained across the regulating spool 12 of the valve assembly 1.

In accordance with yet another important aspect of the present invention, the enclosure 36 communicates with the flow path between ports 5 and 6 and with the flow path between ports 54 and 5 through restrictive clearances located between the dampening spool 15, guide member 10, compensating spool 9, and washers 17a, 17b. The enclosure 36 therefore dampens the movement of the compensating spool 9 to ensure valve stability during adverse operating conditions.

Although the flow regulator 100 of the illustrated embodiment is of specific construction, those skilled in the art will readily appreciate that other types and embodiments of proportional priority flow regulators may alternatively be employed without departing from the scope or spirit of the present invention.

Figure 2:
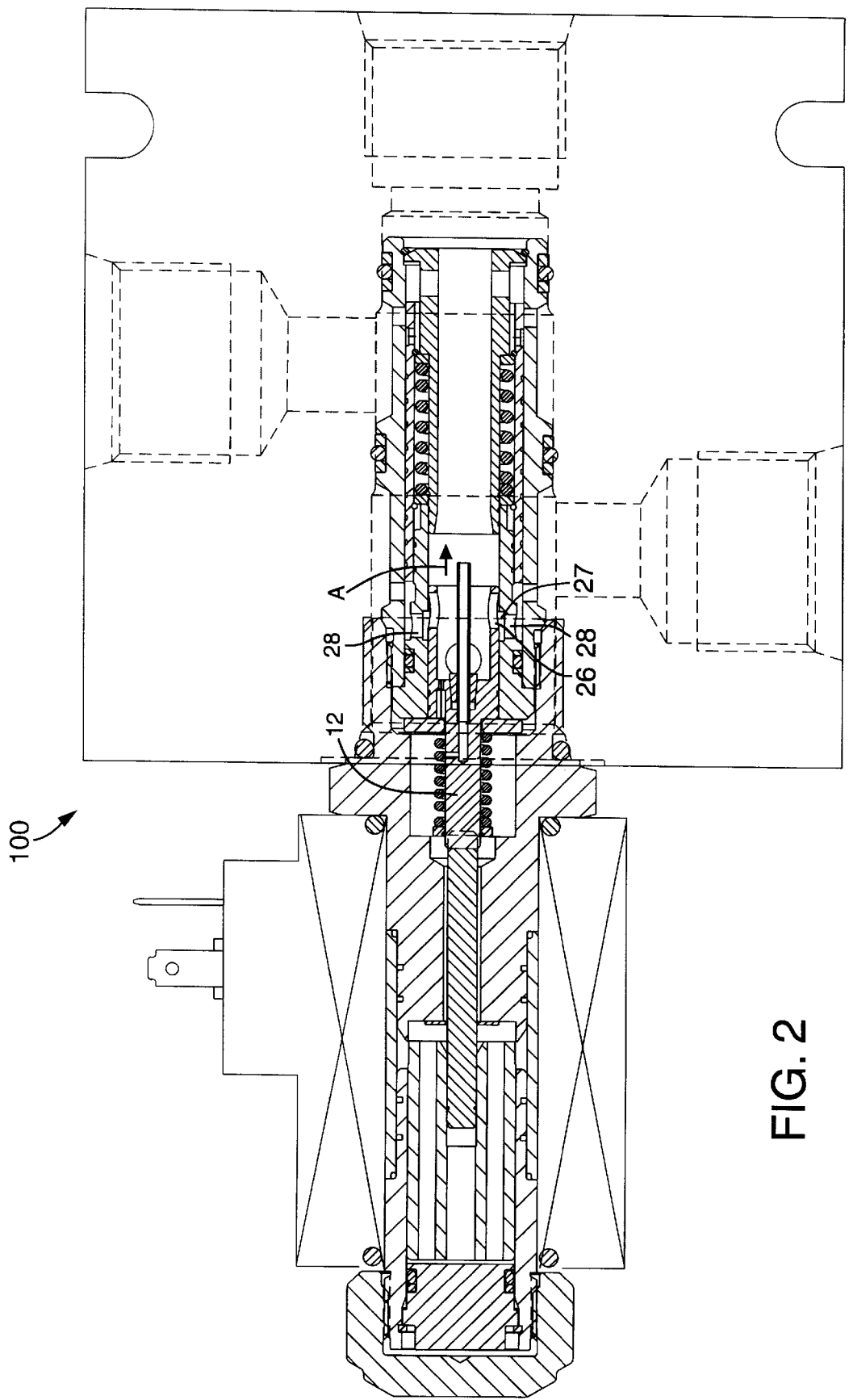
FIG. 2 is a cross-sectional view showing the inventive regulator configured to be normally open.

For example, by making certain minor modifications to the structures disclosed herein, the inventive flow regulator 100 may alternatively have a "normally open" configuration, as shown in FIG. 2 which provides communication between the cross-holes 26 of the regulating spool 12 and the groove 27 and cross-holes 28 of the guide member 10 while in the first operating position, but no communication therebetween while in the second operating position, shown by an arrow A, and gradually diminishing communication therebetween as the current supplied to the solenoid coil 21 is increased.

In addition, the electro-magnetic actuator 11 may alternatively comprise or be replaced by some other mechanical system, such as a screw-type element or the like, which selectively provides a push-type engagement with the regulating spool 12.

What is claimed is:

1. A proportional priority flow regulator comprising:
    a housing having a longitudinal cavity, an inlet port, an outlet port, and a regulated port;
    a cage disposed within the longitudinal cavity, the cage having a row of cross-sectional holes and an internal void, the internal void communicating with the cross-sectional holes, the inlet port, and the regulated port, wherein when the regulator is in an open position, a primary flow path is defined from the inlet port to the regulated port through the internal void and through the row of cross-sectional holes; and
    a compensating spool having a hollow portion and slidably arranged within the cage, the compensating spool permitting the flow of fluid along a reverse flow path defined from the regulated port, through the internal void, through the hollow portion of the compensating spool and to the outlet port, wherein a change in a pressure differential across the compensating spool moves the compensating spool to increase or decrease the opening of the row of cross-sectional holes to control the flow of fluid along at least one of the flow paths.

2. The proportional priority flow regulator of claim 1, further comprising a means for biasing the compensating spool in an intermediate position, wherein an increase in fluid pressure at the regulated port moves the compensating spool to overcome the biasing means to decrease the opening of the row of cross-sectional holes.

3. The proportional priority flow regulator of claim 2, wherein the biasing means comprises a spring.

4. A proportional priority flow regulator comprising:
    a housing having a longitudinal cavity, an inlet port, an outlet port, and a regulated port;
    a cage disposed within the longitudinal cavity, the cage having a first row of cross-sectional holes adjacent to the outlet port, a second row of cross sectional rows adjacent to the regulated port, and an internal void, the internal void communicating with the first and second rows of cross-sectional holes, the inlet port, and the regulated port, wherein when the regulator is in an open position, a primary flow path is defined from the inlet port to the regulated port through the internal void and through the second row of cross-sectional holes, and a reverse flow path is defined from the regulated port to the outlet port through the internal void and through the first row of cross-sectional holes;
    a compensating spool slidably arranged within the cage, wherein a change in a pressure differential across the compensating spool moves the compensating spool to increase or decrease the opening of at least one of the rows of cross-sectional holes to control the flow of fluid along at least one of the flow paths;
    a regulating spool slidably arranged within the cage, wherein the regulating spool has a cross hole and an internal chamber, the internal chamber communicating with the regulating spool cross hole and the internal void of the cage; and
    an electro-magnetic actuator disposed on the valve assembly opposite the housing, wherein when a current is applied to the electro-magnetic actuator, a magnetic force moves the regulating spool to at least partially align the cross hole with the second row of cross-sectional holes to increase the scope of communication between the second row of cross-sectional holes and the regulated port.

5. The proportional priority flow regulator of claim 4, further comprising:
    a dampening spool slidably arranged within the cage opposite the regulating spool, the dampening spool having an internal chamber, the internal chamber communicating with the internal void of the cage and the inlet port.

6. The proportional priority flow regulator of claim 5, further comprising a compensating spring for biasing the compensating spool in an intermediate position, wherein an increase in fluid pressure at the regulated port moves the compensating spool to overcome the biasing of the compensating spring to decrease the opening of the first row of cross-sectional holes.

7. The proportional priority flow regulator of claim 6, wherein the compensating spring is contained in an enclosure defined by the compensating spool and the dampening spool, wherein the enclosure communicates with at least one of the flow paths between the ports through restrictive clearances between the dampening spool and compensating spool.

8. The proportional priority flow regulator of claim 4, further comprising:

a means for biasing the regulating spool to a first position in which the regulating spool cross hole and the second row of cross-sectional holes remain unaligned, wherein the resulting magnetic force overcomes the biasing means to move the regulating spool to a second position in which the regulating spool cross hole and the second row of cross-sectional holes are at least partially aligned, thereby increasing the scope of communication between the second row of cross-sectional holes and the regulated port.

9. The proportional priority flow regulator of claim 8, wherein the biasing means comprises a spring.

10. The proportional priority flow regulator of claim 4, further comprising:

a means for biasing the regulating spool to a first position in which the regulating spool cross hole and the second row of cross-sectional holes are aligned, wherein the resulting magnetic force overcomes the biasing means to move the regulating spool to a second position in which the regulating spool cross hole and the second row of cross-sectional holes are at least partially unaligned, thereby decreasing the scope of communication between the second row of cross-sectional holes and the regulated port.

11. The proportional priority flow regulator of claim 10, wherein the biasing means comprises a spring.

12. The proportional priority flow regulator of claim 4, wherein the regulating spool has a first orifice communicating with the regulating spool internal chamber, a tube member communicating with the first orifice and the internal void of the cage to provide a first fluid path between the regulating spool internal chamber and the internal void of the cage, and a second orifice communicating with the regulating spool internal chamber and the internal void of the cage to provide a second fluid path between the regulating spool internal chamber and the internal void of the cage.

13. A proportional priority flow regulator comprising:

a housing having a longitudinal cavity, an inlet port, an outlet port, and a regulated port;

a cage disposed within the longitudinal cavity, the cage having a row of cross-sectional holes and an internal void, the internal void communicating with the cross-sectional holes, the inlet port, and the regulated port, wherein when the regulator is in an open position, a primary flow path is defined from the inlet port to the regulated port through the internal void and through the row of cross-sectional holes;

means for providing a reverse flow path from the regulated port to the outlet port through the internal void; and a compensating spool slidably arranged within the cage, wherein a change in a pressure differential across the compensating spool moves the compensating spool to increase or decrease the opening of the row of cross-sectional holes to control the flow of fluid along at least one of the flow paths.

14. The proportional priority flow regulator of claim 13, further comprising a means for biasing the compensating spool in an intermediate position, wherein an increase in fluid pressure at the regulated port moves the compensating spool to overcome the biasing means to decrease the opening of the row of cross-sectional holes.

15. The proportional priority flow regulator of claim 14, wherein the biasing means comprises a spring.

* * * * *